(12) United States Patent
Joo

(10) Patent No.: US 10,129,124 B2
(45) Date of Patent: Nov. 13, 2018

(54) METHOD AND APPARATUS FOR CONTROLLING IN-VEHICLE MASS DIAGNOSTIC COMMUNICATION

(71) Applicant: HYUNDAI MOTOR COMPANY, Seoul (KR)

(72) Inventor: Hyung Jin Joo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 254 days.

(21) Appl. No.: 15/157,242

(22) Filed: May 17, 2016

(65) Prior Publication Data

US 2017/0171051 A1   Jun. 15, 2017

(30) Foreign Application Priority Data

Dec. 10, 2015 (KR) ........................ 10-2015-0175860

(51) Int. Cl.
*H04L 12/26* (2006.01)
*H04L 29/08* (2006.01)
(Continued)

(52) U.S. Cl.
CPC ........ *H04L 43/0882* (2013.01); *H04L 12/403* (2013.01); *H04L 12/66* (2013.01);
(Continued)

(58) Field of Classification Search
None
See application file for complete search history.

(56) References Cited

U.S. PATENT DOCUMENTS 6,801,942 B1 *  10/2004  Dietrich .............. H04L 12/4625
                                                                709/217
8,774,210 B2 *   7/2014  Grohman .............. H04L 12/413
                                                                370/448
(Continued)

FOREIGN PATENT DOCUMENTS

JP        2015-099951 A     5/2015
KR    10-2007-0065833 A     6/2007
(Continued)

OTHER PUBLICATIONS

Korean Office Action dated Oct. 4, 2016 issued in Korean Patent Application No. 10-2015-0175860.

*Primary Examiner* — Thomas J Dailey
(74) *Attorney, Agent, or Firm* — McDermott Will & Emery LLP

(57) ABSTRACT

The present disclosure relates to a method and apparatus for controlling mass diagnostic communication in a vehicle capable to prevent a transmission error of a diagnostic message which can occur during mass diagnostic communication. The method of controlling mass diagnostic communication in a controller connected to a vehicle controller area network (CAN) communication network may include calculating a reception time interval between a previously received CAN frame and a currently received CAN frame, calculating a CAN frame processing time in the controller based on a length of data included in the received CAN frame, and determining a separation transmission period of a mass diagnostic message by comparing the calculated reception time interval with the calculated CAN frame processing time.

21 Claims, 6 Drawing Sheets

(51) Int. Cl.
*H04L 12/66* (2006.01)
*H04L 12/403* (2006.01)
*H04L 12/801* (2013.01)
*H04L 12/851* (2013.01)
*H04L 12/841* (2013.01)
*H04L 12/823* (2013.01)
*H04L 29/06* (2006.01)

(52) U.S. Cl.
CPC .............. *H04L 47/12* (2013.01); *H04L 47/13* (2013.01); *H04L 47/24* (2013.01); *H04L 47/28* (2013.01); *H04L 47/283* (2013.01); *H04L 47/32* (2013.01); *H04L 67/12* (2013.01); *H04L 43/10* (2013.01); *H04L 69/28* (2013.01)

(56) References Cited

U.S. PATENT DOCUMENTS 9,294,412 B2 * 3/2016 Horvath ................ H04L 47/283

| | | | |
|---|---|---|---|
| 2003/0176951 A1* | 9/2003 | DeMarchi ........... | H01M 8/0612 700/286 |
| 2005/0226275 A1* | 10/2005 | Hrycaj ................. | H04L 1/1803 370/474 |
| 2011/0167147 A1* | 7/2011 | Andersson .......... | H04L 43/0858 709/224 |
| 2012/0140861 A1* | 6/2012 | Menon ...................... | B60T 7/18 375/356 |
| 2015/0003443 A1* | 1/2015 | Koenigseder ......... | H04W 40/20 370/350 |
| 2017/0013005 A1* | 1/2017 | Galula ............... | H04L 63/1425 |

FOREIGN PATENT DOCUMENTS

| | | |
|---|---|---|
| KR | 10-2009-0063430 A | 6/2009 |
| KR | 10-1476240 B1 | 12/2014 |
| KR | 10-2015-0001018 A | 1/2015 |
| KR | 10-2015-0019499 A | 2/2015 |
| KR | 10-2015-0033075 A | 4/2015 |
| KR | 10-2015-0047683 A | 5/2015 |
| WO | 2009-123201 A1 | 10/2009 |

* cited by examiner

| DLC | 0000 | 0001 | 0010 | 0011 | 0100 | 0101 | 0110 | 0111 | 1000 |
|---|---|---|---|---|---|---|---|---|---|
| DATA LENGTH (BYTE) | 0 | 1 | 2 | 3 | 4 | 5 | 6 | 7 | 8 |

METHOD AND APPARATUS FOR CONTROLLING IN-VEHICLE MASS DIAGNOSTIC COMMUNICATION

This application claims the benefit of priority to Korean Patent Application No. 10-2015-0175860, filed on Dec. 10, 2015, which is hereby incorporated by reference as if fully set forth herein.

TECHNICAL FIELD

The present disclosure relates to in-vehicle mass diagnostic communication, and more particularly, to a method and apparatus for controlling in-vehicle mass diagnostic communication capable of preventing a diagnostic communication error by adaptively controlling a frame transmission period based on network load measured in real time.

BACKGROUND

Recently, rapid development in information technology (IT) has greatly affected the automobile industry, and IT and communication technologies have been combined with a vehicle.

In particular, recently released vehicles include various wireless communication functions for communication with an external device. In this way, various application services have been provided.

For example, a route guidance device such as a navigation system is a significantly useful device that assists a driver in identifying a location of a road on which the driver is currently driving or in easily locating a destination when the driver drives in an unfamiliar area by positioning a current location of a vehicle based on a signal received through a global positioning system (GPS) satellite, reading map data corresponding to the positioned current location from an incorporated map database, and displaying the map data on a screen together with the current location of the vehicle.

In addition, recently released vehicles include various in-vehicle communication networks for exchanging information among various controllers included in the vehicle and diagnosing conditions thereof.

In particular, most recently released vehicles include various vehicle safety systems and driver convenience systems. Accordingly, the amount of data transmitted and received in an in-vehicle communication network has rapidly increased.

Therefore, in a current trend, a gateway has been applied to midsize and full-size cars to balance communication load. In addition, a rapider communication scheme such as a controller area network (CAN) with Flexible Data rate (CAN-FD), Ethernet, etc. has entered advanced development in preparation for communication load to be increased in the future.

A diagnostor for vehicles communicates with a controller according to a diagnostic communication standard (for example, including ISO15765-2) for diagnosis, compulsory driving, reprogramming, etc. of controllers included in a vehicle. In this instance, the diagnostor and the controller for vehicles may be routed through a gateway for vehicles.

For example, a CAN communication scheme may be used as the in-vehicle communication network. In this case, a CAN frame may be used as a diagnostic message.

A CAN frame for diagnosis may be divided into a single frame in which a size of a transmission block does not exceed 8 bytes and consecutive frames in which a size of a transmission block exceeds 8 bytes and thus the transmission block needs to be transmitted in several segmented CAN frames.

Referring to the consecutive frames, a receiving end transmits, to a transmitting end, information about a data block size (BS) of data blocks to be received through the consecutive frames and a transmission period of the consecutive frames for the data blocks, that is, a value of Separation Time Min (STMin) through a flow control frame.

However, BS and STMin values applied to a conventional controller for vehicles have been previously defined and used based on a size of a memory installed in the controller, CPU performance, etc. at the time of developing the controller. Therefore, there has been a problem in that data loss occurs and thus a diagnostic communication error is generated when load of an in-vehicle network intermittently and abruptly increases or overflow of bus capacity occurs.

Moreover, the BS and STMin values applied to the conventional controller for vehicles have been preset based on performance of a separate controller without considering a real-time condition of network load, and thus have not been dynamically changed in response to addition/deletion/change of the controller in the vehicle and real-time variation in network load. Therefore, there has been a disadvantage in that diagnosis and reprogramming time could not be optimized.

SUMMARY

Accordingly, the present disclosure is directed to a method and apparatus for controlling in-vehicle mass diagnostic communication that substantially obviate one or more problems due to limitations and disadvantages of the related art.

An object of the present disclosure is to provide a vehicle gateway capable of dynamically calculating a separation transmission period, in which a diagnostic message received from a diagnostor can be routed, based on network load such that the diagnostic message is not omitted during transmission, and transmitting the calculated separation transmission period to a controller to be diagnosed when the diagnostor and the controller to be diagnosed communicate with each other through the vehicle gateway.

Another object of the present disclosure is to provide a method and apparatus for controlling mass diagnostic communication in a vehicle capable of adaptively controlling a separation transmission period of a diagnostic message by measuring a reception interval on a CAN bus of a message having a higher priority than that of the diagnostic message and a processing time of the message.

Technical problems to be solved by the present disclosure are not limited to the above-mentioned technical problems, and other technical problems not mentioned herein may be clearly understood by those skilled in the art from description below.

The present disclosure provides a method and apparatus for controlling mass diagnostic communication in a vehicle.

To achieve these objects and other advantages and in accordance with the purpose of the present disclosure, as embodied and broadly described herein, a method of controlling mass diagnostic communication in a controller connected to a vehicle controller area network (CAN) communication network, includes calculating, by the controller, a reception time interval between a previously received CAN frame and a currently received CAN frame, calculating, by the controller, a CAN frame processing time in the controller based on a length of data included in the received CAN frame, and determining, by the controller, a separation transmission period of a mass diagnostic message by comparing the calculated reception time interval with the calculated CAN frame processing time.

Here, the reception time interval may be calculated when an identifier (ID) included in the received CAN frame has a higher priority than a priority of a diagnostic ID allocated to the controller.

The CAN frame processing time may be calculated based on a data length code (DLC) included in the previously received CAN frame.

A predetermined flow control frame including the determined separation transmission period may be transmitted, by the controller, to a diagnostor, when a predetermined CAN frame reporting transmission of the mass diagnostic message is received from the diagnostor.

The separation transmission period may be determined such that a currently set separation transmission period increases by a predetermined time when the CAN frame processing time is greater than or equal to the reception time interval as a result of comparison.

Here, the increased time may correspond to the reception time interval.

In addition, the separation transmission period may be determined such that a currently set separation transmission period decreases by a predetermined time when the CAN frame processing time is less than the reception time interval as a result of comparison.

As an example, a control operation may be performed such that the calculated reception time interval is replaced by the separation transmission period to decrease the separation transmission period when the calculated reception time interval is greater than the currently set separation transmission period.

As another example, the decreased time of the separation transmission period may be determined in inverse proportion to a CAN bus load.

In another aspect of the present disclosure, a method of controlling mass diagnostic communication in a vehicle gateway routing a diagnostic message received from a diagnostor to a controller to be diagnosed through a CAN bus, includes monitoring, by the vehicle gateway, a load state of the CAN bus in real time, determining, by the vehicle gateway, a separation transmission period based on the monitored load state of the CAN bus, and transmitting, by the vehicle gateway, a predetermined control signal including the determined separation transmission period to the controller to be diagnosed.

The monitoring may include adding sizes of messages generated on the CAN bus during a unit time, and calculating an average bus load of the CAN bus by dividing the added size of the messages by a maximum size of a message generable on the CAN bus during the unit time. The separation transmission period may be determined based on the calculated average bus load.

The monitoring may include measuring an average time interval for which a load of the CAN bus is full during a unit time and an occurrence frequency at which the load is full. The separation transmission period may be determined based on at least one of the measured average time interval for which the load is full and the measured occurrence frequency at which the load is full.

The controller to be diagnosed may transmit a flow control frame including the determined separation transmission period to the diagnostor through the vehicle gateway.

The method may further include receiving, by the vehicle gateway, consecutive frames generated based on the flow control frame from the diagnostor. Routing of the received consecutive frames may be delayed until a state in which the load of the CAN bus is full is released when the CAN bus is in the state at a point in time at which the consecutive frames are received.

Here, the method may further include increasing, by the vehicle gateway, the separation transmission period when a delayed time exceeds the determined separation transmission period, and transmitting, by the vehicle gateway, the control signal including the increased separation transmission period to the controller to be diagnosed.

In another aspect of the present disclosure, a vehicle controller connected to a vehicle CAN communication network, includes a CAN transceiver for transmitting and receiving a CAN frame through the CAN communication network, and a main control unit for calculating a reception time interval between a previously received CAN frame and a currently received CAN frame, calculating a CAN frame processing time in the controller based on a length of data included in the received CAN frame, and determining a separation transmission period of a mass diagnostic message by comparing the calculated reception time interval with the calculated CAN frame processing time.

In another aspect of the present disclosure, it is possible to provide a recording medium recording a program for executing any one of the methods of controlling mass diagnostic communication described above.

It should be noted that the above-mentioned technical solutions are merely a part of embodiments of the present disclosure, and various embodiments reflecting technical characteristics of the present disclosure may be derived and understood by those skilled in the art from detailed description of the present disclosure given below.

BRIEF DESCRIPTION OF THE DRAWINGS

The accompanying drawings are included to provide a further understanding of the disclosure and provide embodiments of the present disclosure together with the detailed description. However, a technical characteristic of the disclosure is not restricted to a particular drawing, and characteristics disclosed in the respective drawings may be combined and configured as a new embodiment.

DETAILED DESCRIPTION OF THE DISCLOSURE

Reference will now be made in detail to an apparatus and various methods to which the preferred embodiments of the present disclosure are applied. The suffixes "module" and "unit" of elements herein are used for convenience of description and thus can be used interchangeably and do not have any distinguishable meanings or functions.

Although all elements constituting the embodiments of the present disclosure are described as being integrated into a single one or operated as a single one, the present disclosure is not necessarily limited to such embodiments. According to embodiments, all of the elements may be selectively integrated into one or more and be operated as one or more within the object and scope of the present disclosure. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present disclosure pertains. The computer program may be stored in computer readable media such that the computer program is read and executed by a computer to implement embodiments of the present disclosure. Computer program storage media may include magnetic recording media, optical recording media, and carrier wave media.

The terms "comprises", "includes", and "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings in the related art from the context. Unless obviously defined in the present disclosure, such terms should not be interpreted as having ideal or excessively formal meanings.

It will be understood that, although the terms first, second, A, B, (a), (b), etc. may be used herein to describe various elements of the present disclosure, these terms are only used to distinguish one element from another element and essence, order, or sequence of corresponding elements are not limited by these terms. It will be understood that when one element is referred to as "connected to", "coupled to", or "accessing" another element, one element may be "connected to", "coupled to", or "access" another element via a further element although one element may be directly connected to or directly access another element.

Figure 1:
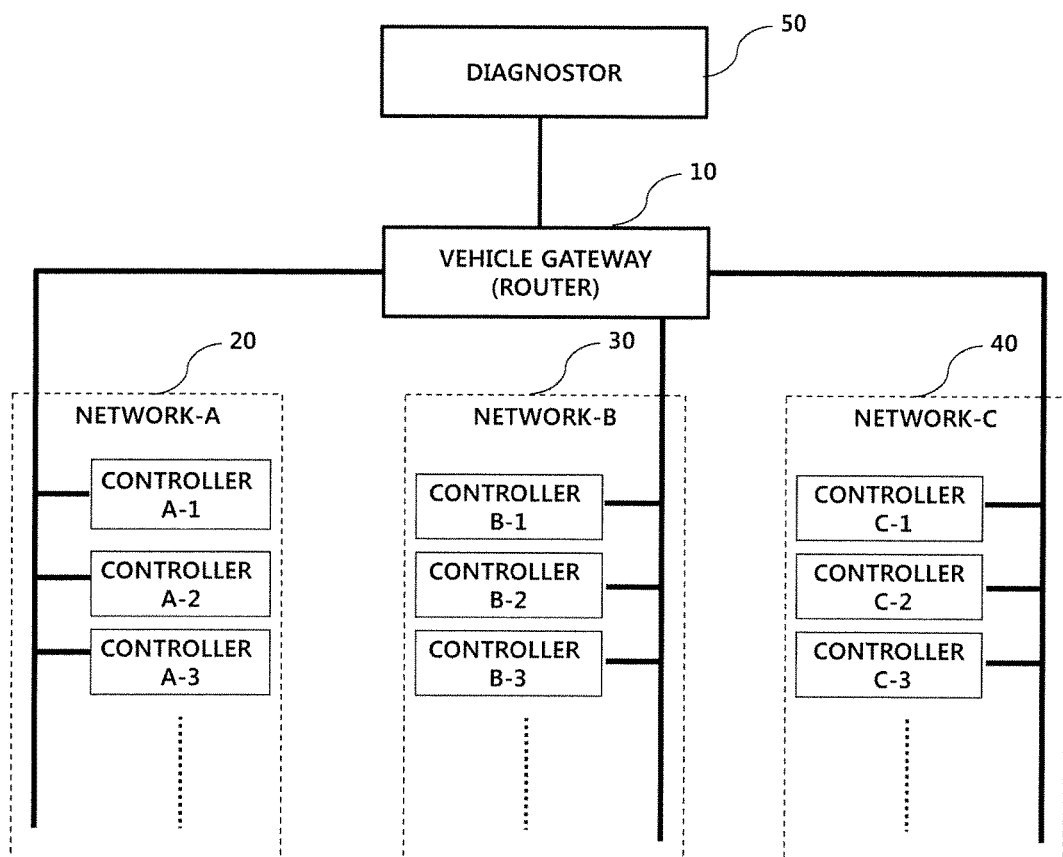
FIG. 1 is a block diagram for description of a configuration of a vehicle controller area network (CAN) communication network according to the present disclosure.

FIG. 1 is a diagram for description of a configuration of a vehicle controller area network (CAN) communication network according to the present disclosure.

Referring to FIG. 1, an in-vehicle communication system may include a vehicle gateway 10 for providing a routing function during communication between controllers installed in a vehicle, and network(s) (for example, a network A 20, a network B 30, and a network C 40) of various domains connected to the vehicle gateway 10. Each of the networks or domains may include at least one controller. Examples of the domain may include a body domain, a chassis domain, a driver assistance system domain, a power train domain, a surround view domain, a head unit domain, etc. However, the present disclosure is not limited thereto, and it should be noted that a name and a type of a corresponding domain may differ according to a vehicle manufacturer and a car model.

In addition, a communication scheme between the vehicle gateway 10 and a network may be different for each domain, and the in-vehicle communication system may include a plurality of vehicle gateways. Examples of a communication scheme applicable to the in-vehicle communication system may include controller area network (CAN) communication, local interconnect network (LIN) communication, FlexRay communication, Ethernet communication, etc. However, the present disclosure is not limited thereto.

For example, an in-vehicle communication network, to which a method of dynamically controlling secure vehicle communication according to the present disclosure is applied, may be suitable for a network that performs broadcast communication. However, the present disclosure is not limited thereto.

In description below, CAN communication, in which the networks connected to the vehicle gateway 10 perform broadcast communication, will be given as an example.

In addition, a diagnostor 50 may be connected to the vehicle gateway 10 according to an embodiment of the present disclosure. As an example, the diagnostor 50 may be connected to the vehicle gateway 10 through a predetermined connector for diagnostors included in the vehicle to perform diagnostic communication with the controllers installed in the vehicle through the connected vehicle gateway 10. In this instance, the diagnostor 50 and the vehicle gateway 10 may communicate with each other using a communication scheme other than CAN communication. For example, RS232 serial communication may be used as communication between the diagnostor 50 and the vehicle gateway 10. However, the present disclosure is not limited thereto, and it should be noted that another communication scheme may be used according to vehicle manufacturer. As another example, near field communication rather than wired communication may be used as communication between the diagnostor 50 and the vehicle gateway 10. For example, near field communication may correspond to one of Wi-Fi communication, ZigBee communication, ultra wide band (UWB) communication, and Bluetooth communication. However, the present disclosure is not limited thereto.

The vehicle gateway 10 according to the present embodiment may generate new identifiers (IDs) for the controllers included in all the networks 20, 30, and 40 connected thereto each time the vehicle is started, and update a routing table using the generated new IDs. Here, the new IDs may correspond to information for uniquely identifying the controllers in the vehicle, the vehicle gateway 10, or the networks. For example, in CAN communication, the new IDs may be included in output messages of the respective controllers and transmitted, and each of the controllers may identify a controller, from which a message may be received, through a new ID included in a received message. To this end, each of the controllers may maintain information about IDs of controllers, from which messages are allowed to be received, that is, a list of receivable ID. When a controller receives a message excluding an ID of a controller, from which a message is allowed to be received, the controller may discard the received message.

In general, a CAN communication bus does not include a master that controls all nodes when each node, that is, an electronic control unit (ECU) or a controller accesses data moving through the CAN bus to perform a read or write operation. Therefore, when each node is prepared to transmit data, each node may transmit a CAN frame to the network after verifying whether a CAN bus line is in use. In this instance, the transmitted CAN frame neither includes an address of a transmission node nor an address of a reception node. Instead, an ID for uniquely identifying the controller that transmits the CAN frame is transmitted in the CAN frame.

When the respective nodes attempt to simultaneously transmit messages on the CAN bus, a node having top priority, for example, a node having a lowest arbitration ID may automatically access the bus. An arbitration ID currently in use in CAN communication has a length of 11 bits (CAN 2.0 Part A) or 29 bits (CAN 2.0 Part B).

In other words, the ID of the CAN frame may be used to identify content of a message and to identify a priority of the message. For example, an allocation range of a controller ID may be 0x000h to 0x7ffh or 0x000h to 0x6ffh in an application message, and may be 0x700h to 0x7ffh in a diagnostic message. However, the present disclosure is not limited thereto, and it should be noted that the allocation range may vary according to length of an arbitration ID field and/or vehicle manufacturer and model.

Figures 2, 3:
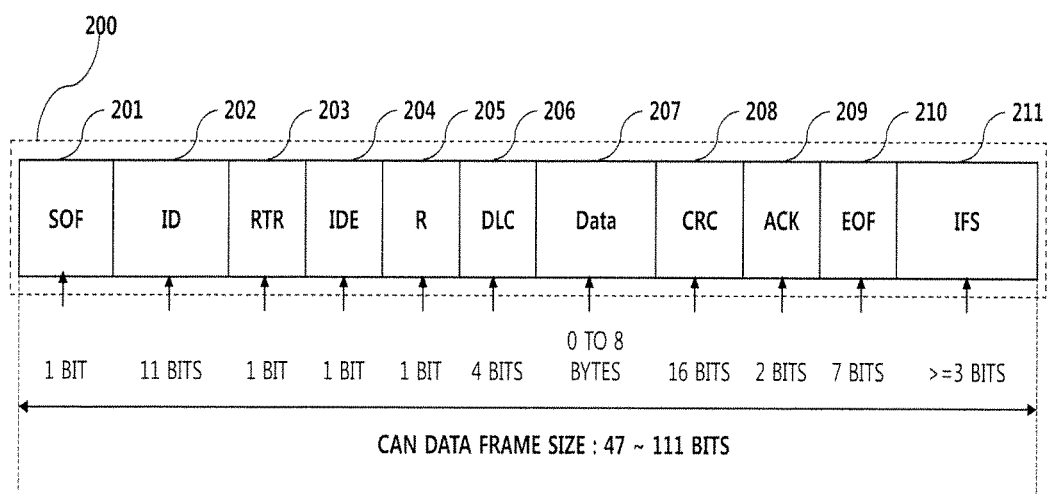
FIG. 2 is a diagram illustrating a structure of a CAN data frame defined in an international standard.
FIG. 3 is a table for description of definition of a DLC in the CAN data frame according to the international standard.

FIG. 2 illustrates a structure of a CAN data frame 200 defined in the international standard.

Referring to FIG. 2, the CAN data frame 200 may include a start of frame (SOF) field 201, an identifier field 202, a remote transmission request (RTR) field 203, an identifier extension (IDE) field 204, a reserved (R) field 205, a data length code (DLC) field 206, a data field 207, a cyclic redundancy check (CRC) field 208, an acknowledgement (ACK) field 209, an end of frame (EOF) field 210, and an inter-frame space (IFS) field 211.

The SOF field 201 has a length of 1 bit, and is used to indicate a start of a frame.

The ID field 202 corresponds to information for identifying a type of a message and designating a priority of the message. In the present example, a standard CAN data frame format in which the ID field 202 has a length of 11 bits is illustrated. However, an extended CAN data frame format in which the ID field 202 has a length of 29 bits is defined in the standard.

The IDE field 204 is used to verify whether a frame is a standard frame or an extended frame, and has a length of 1 bit. For example, the IDE field 204 may indicate the standard frame when a value thereof is 0, and may indicate the extended field when a value thereof is 1.

The RTR field 203 is used to verify whether a frame is a remote frame or a data frame and has a length of 1 bit. For example, the RTR field 203 may indicate the data frame when a value thereof is 0, and may indicate the remote frame when a value thereof is 1.

The R field 205 is a field, use of which is not defined in a current standard, and is a field reserved for future use. This field has a length of 1 bit.

The DLC field 206 corresponds to code information for identifying a length in bytes of data included in a frame, and has a length of 4 bits.

The data field 207 may have a variable length in a range of 0 to 8 bytes.

The CRC field 208 includes a cyclic redundancy check code of 15 bits and a reverse delimiter of 1 bit, and is used to verify whether an error is present in a received frame.

The ACK field 209 is a field for verifying whether the receiving end has normally received a frame, and has a length of 2 bits. Every CAN controller accurately receiving the CAN data frame 200 transmits an ACK bit positioned at a tail of the frame. A transmission node verifies whether the ACK bit is present on the bus, and attempts retransmission of the frame when the ACK bit is not found.

The EOF field 210 is a field for indicating an end of the CAN frame, and has a length of 7 bits.

The IFS field 211 may be used to provide time required for the CAN controller to process consecutive frames, and secure time necessary to accurately move a received frame to an appropriate location in a message buffer area.

As described in the foregoing, the CAN data frame has a variable length in a range of 47 bits to 111 bits in total. When the data field 207 has a length of 8 bytes, the data field 207 accounts for 58% of the whole CAN data frame.

A CAN communication message is provided in various frame forms such as a data frame, a remote frame, an error frame, etc.

FIG. 3 is a table for description of definition of a DLC in the CAN data frame according to the international standard.

As described above with reference to FIG. 2, the DLC field 206 corresponds to information for identifying a length of data included in the CAN data frame 200, and has a length of 4 bits. In the current standard, a maximum length of data is 8 bytes, and thus only a range from "0000" in base 2 to "1000" in base 2 is defined and used as a value of the DLC field 206 as illustrated in FIG. 3.

For example, when the DLC field 206 has a value of "0000" in base 2, the value indicates that the data field 207 has a length of 0 bytes. When the DLC field 206 has a value of "1000" in base 2, the value indicates that the data field 207 has a length of 8 bytes.

The value of "0000" in base 2 of the DLC field 206 indicates that the data field 207 included in the CAN data frame is identical to a data field 207 of an immediately previously transmitted CAN data frame. Therefore, when previous data is identical to current data to be transmitted, the transmission node sets a value of the DLC field 206 to "0000" in base 2, generates a CAN data frame in which a data field 207 is not filled, and transmits the generated CAN data frame to a CAN network. When the DLC field 206 of the received CAN data frame has a value of "0000" in base 2, a reception node may determine that current data is identical to previously received data.

In other words, when data is unchanged, the transmission node does not actually transmit data, and transmits the value of "0000" in base 2 as the value of the data field 207. Therefore, CAN network load may be reduced.

Figure 4:
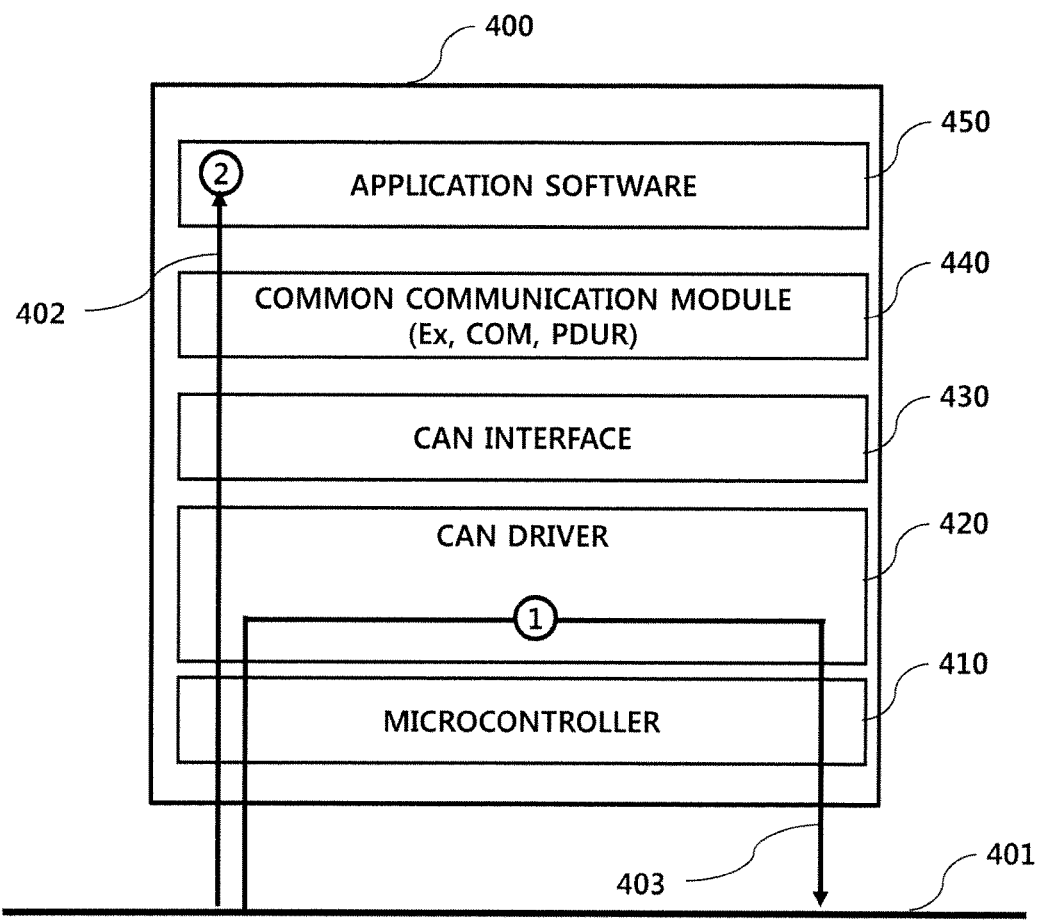
FIG. 4 is a block diagram for description of a hierarchical structure of a vehicle controller according to an embodiment of the present disclosure.

FIG. 4 is a diagram for description of a hierarchical structure of a vehicle controller 400 according to an embodiment of the present disclosure.

The vehicle controller 400 may include a microcontroller 410, a CAN driver 420, a CAN interface 430, a common communication module 440, and application software 450.

The microcontroller 410 may include hardware (for example, a CAN transceiver) for transmitting and receiving a CAN signal through physical access to a CAN bus 401, and a main control unit (MCU) for allocating CPU and memory resources necessary for operation of the vehicle controller 400.

The CAN transceiver of the microcontroller 410 may detect a CAN signal on the CAN bus 401 and deliver the detected CAN signal to the CAN driver 420.

In particular, the MCU of the microcontroller 410 according to the present embodiment may calculate a reception time interval between a previously received CAN frame and a currently received CAN frame, calculate a CAN frame processing time in the controller based on lengths of data included in the received CAN frames, and determine a separation transmission period of a mass diagnostic message by comparing the calculated reception time interval with the calculated CAN frame processing time.

In addition, when an ID included in the received CAN frames has a higher priority than that of a diagnosis ID allocated to the controller, the MCU of the microcontroller 410 may calculate the reception time interval.

Further, the MCU of the microcontroller 410 may calculate the CAN frame processing time based on a DLC included in the previously received CAN frame.

Furthermore, when a predetermined CAN frame reporting transmission of the mass diagnostic message is received from a diagnostor, the MCU of the microcontroller 410 may perform a control operation such that a predetermined flow control frame including the determined separation transmission period is transmitted to the diagnostor.

In addition, when the CAN frame processing time is greater than or equal to the reception time interval as a result of comparison, the MCU of the microcontroller 410 may determine the separation transmission period such that a currently set separation transmission period increases by a predetermined time.

Here, the increased time may correspond to the reception time interval.

On the other hand, when the CAN frame processing time is less than the reception time interval as a result of comparison, the MCU of the microcontroller 410 may determine the separation transmission period such that a currently set separation transmission period decreases by a predetermined time.

In this instance, the decreased time may be determined in inverse proportion to CAN bus load.

The CAN driver 420 may identify a CAN frame from a received CAN signal, and verify whether the CAN frame is a CAN frame that needs to be received by the vehicle controller 400 based on an ID of the identified CAN frame. When the CAN frame is intended for the CAN driver 420 as a result of verification, the CAN driver 420 delivers the received CAN frame to the CAN interface 430 as indicated by an arrow 402. On the other hand, when the CAN frame is not intended for the CAN driver 420, the CAN driver 420 returns the received CAN frame to the CAN bus 401 as indicated by an arrow 403.

The CAN interface 430 may provide an access interface that allows the common communication module 440 to access the CAN driver 420.

The common communication module 440 may perform a function of routing a packet which is transmitted and received between the application software 450 and various vehicle communication modules included in the vehicle controller 400. Here, the vehicle communication modules may include a LIN communication module, an Ethernet communication module, etc. in addition to a CAN communication module.

Figure 5:
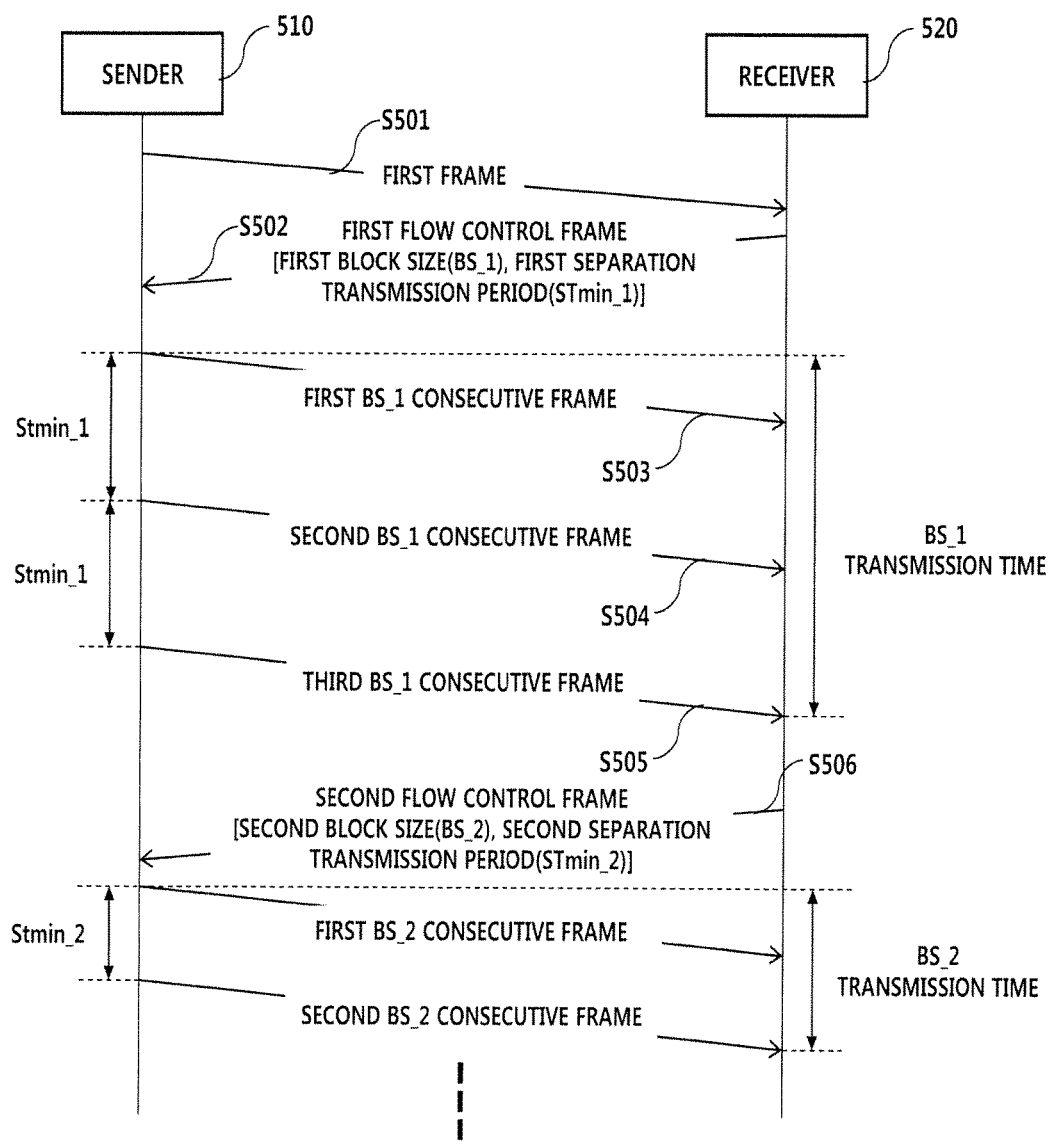
FIG. 5 is a flowchart for description of a mass diagnostic communication procedure in a vehicle according to an embodiment of the present disclosure.

FIG. 5 is a flowchart for description of a mass diagnostic communication procedure in a vehicle according to an embodiment of the present disclosure.

A sender 510 illustrated in FIG. 5 may correspond to a diagnostor and a receiver 520 illustrated in FIG. 5 may correspond to a controller to be diagnosed.

Referring to FIG. 5, when the sender 510 transmits a first frame to the receiver 520, the receiver 520 may transmit a first flow control frame including a first block size (BS_1) and a first separation transmission period (STmin_1) to the sender 510.

In S503 to 5505, the sender 510 may calculate the number of consecutive frames to be transmitted corresponding to the first block size based on the received first flow control frame, and transmit consecutive frames (first to third BS_1 consecutive frames), the number of which corresponds to the calculated number, to the receiver 520. Here, the number of consecutive frames may be calculated by dividing the block size by a size of a diagnostic message to be transmitted. For example, when the first block size is 24 bytes, and the diagnostic message has a size of 8 bytes, the number of consecutive frames may be three.

When the diagnostic message corresponding to the first block size is fully received, the receiver 520 may generate a second flow control frame including a second block size (BS_2) and a second separation transmission period (STmin_2) and transmit the generated second flow control frame to the sender 510 in S506.

In S507 and S508, the sender 510 may calculate the number of consecutive frames to be transmitted corresponding to the second block size based on the received second flow control frame, and transmit consecutive frames (first and second BS_2 consecutive frames), the number of which corresponds to the calculated number, to the receiver 520.

A block size and a separation transmission period included in a conventional flow control frame have been determined based on a size of a memory included in a controller and performance of the controller analyzed in advance at the time of developing the controller. Thereafter, the block size and the separation transmission period have been set in advance for the controller in a factory initialization step and have not been changed. Therefore, there has been a disadvantage in that a mass diagnostic message could not be adaptively processed according to a network condition that varies in real time.

On the other hand, in the above example of FIG. 5, block size information and separation transmission period information included in a flow control frame may be dynamically determined based on a load condition of a CAN bus.

As an example, the receiver 520 may have a long separation transmission period when load of the CAN bus is high and have a short separation transmission period when load of the CAN bus is low.

As another example, when a reception interval of a current CAN frame is shorter than a processing time required for internal processing of a received CAN frame, the receiver 520 may increase a separation transmission period. On the other hand, when a reception interval of a current CAN frame is shorter than a processing time required for internal processing of a received CAN frame, the receiver 520 may decrease a separation transmission period or set a value of the separation transmission period to 0, thereby performing a control operation such that the sender 510 may transmit a diagnostic message at any time.

A priority of a CAN frame transmitted and received on the CAN bus may differ according to ID information included in the CAN frame. Therefore, when each controller connected to the CAN bus receives a CAN frame having a higher priority than that of the controller, the controller may adaptively determine a separation transmission period by measuring and/or estimating a reception interval of the CAN frame and an internal processing time of the CAN frame.

In general, the diagnostic message has a priority set to be lower than that of another control message. Therefore, there is an advantage of minimizing a diagnostic error when load on the CAN bus of a control message having a higher priority than that of the diagnostic message is measured in real time for each controller, and a separation transmission period and a block size for each controller are determined based on the measured load.

Figure 6:
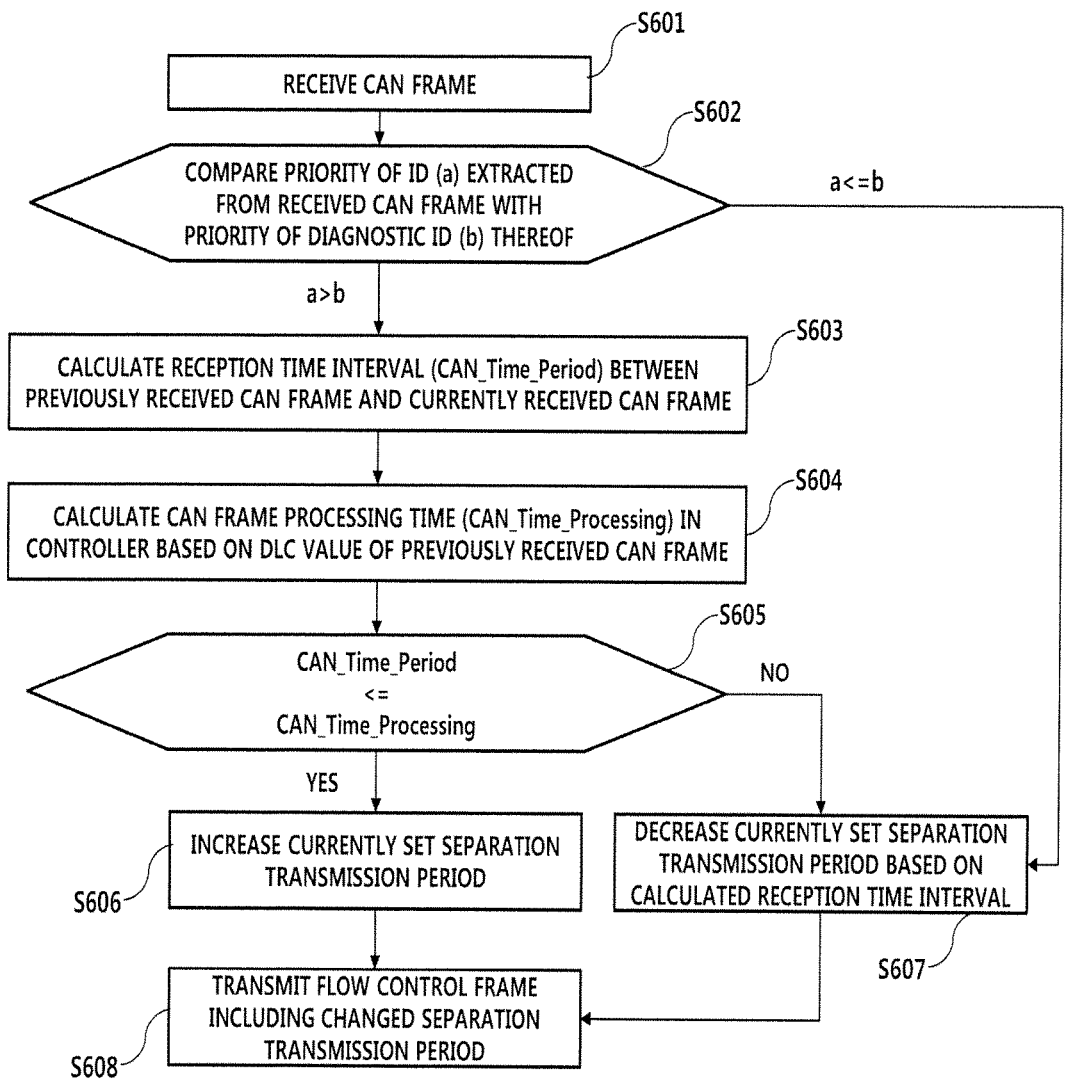
FIG. 6 is a flowchart for description of a method of controlling mass diagnostic communication in a controller to be diagnosed according to an embodiment of the present disclosure.

FIG. 6 is a flowchart for description of a method of controlling mass diagnostic communication in a controller to be diagnosed according to an embodiment of the present disclosure.

Referring to FIG. 6, when a CAN frame is received, the controller may extract an ID of the received CAN frame, and compare a priority of the extracted ID with a priority of a diagnostic ID previously allocated to the controller in S601 and S602.

When the priority of the extracted ID is higher than the priority of the diagnostic ID allocated to the controller as a result of comparison, the controller may calculate a reception time interval (hereinafter referred to as "CAN_Time_Period" for convenience of description) between a previously received CAN frame and the currently received CAN frame in S603.

In S604, the controller may calculate a CAN frame processing time (hereinafter referred to as "CAN_Time_Processing" for convenience of description) in the controller based on a DLC value of the previously received CAN frame.

Subsequently, in S605, the controller may determine whether the CAN_Time_Processing is greater than or equal to the CAN_Time_Period.

When the CAN_Time_Processing is greater than or equal to the CAN_Time_Period as a result of determination, the controller may determine that the CAN bus load is full, and increase a current separation transmission period (STmin) by a certain level in S606. Here, an increase amount of the separation transmission period may correspond to the calculated CAN_Time_Period. However, the present disclosure is not limited thereto.

When the CAN_Time_Processing is less than the CAN_Time_Period as a result of determination in S605, the controller may determine that the diagnostic message may be received under a current load condition of the CAN bus. In this instance, when the CAN_Time_Period calculated in S603 is greater than the currently set separation transmission period (STmin), the currently set separation transmission period (STmin) may be replaced by a value of the CAN_Time_Period to store the CAN_Time_Period value, and the CAN_Time_Period value may be initialized to 0 in S607.

Specifically, when the CAN_Time_Processing is less than the CAN_Time_Period, and the currently set separation transmission period (STmin) is greater than the calculated CAN_Time_Period, the controller may decrease a separation transmission period by replacing the separation transmission period with the CAN_Time_Period value.

As another example, when the CAN_Time_Processing is less than the CAN_Time_Period, a decrease amount of the current separation transmission period may be dynamically calculated based on a value obtained by subtracting the CAN_Time_Processing from the CAN_Time_Period. For example, the decrease amount of the separation transmission period may be determined in proportion to a difference (CAN_Time_Period−CAN_Time_Processing) between the CAN_Time_Period and the CAN_Time_Processing. In addition, when the difference between the CAN_Time_Period and the CAN_Time_Processing exceeds a predetermined reference value, the separation transmission period may be initialized to 0. In this case, a diagnostor may transmit the diagnostic message to be transmitted to the controller at any time.

In S608, the controller may transmit a flow control frame including a changed separation transmission period to the diagnostor.

Figure 7:
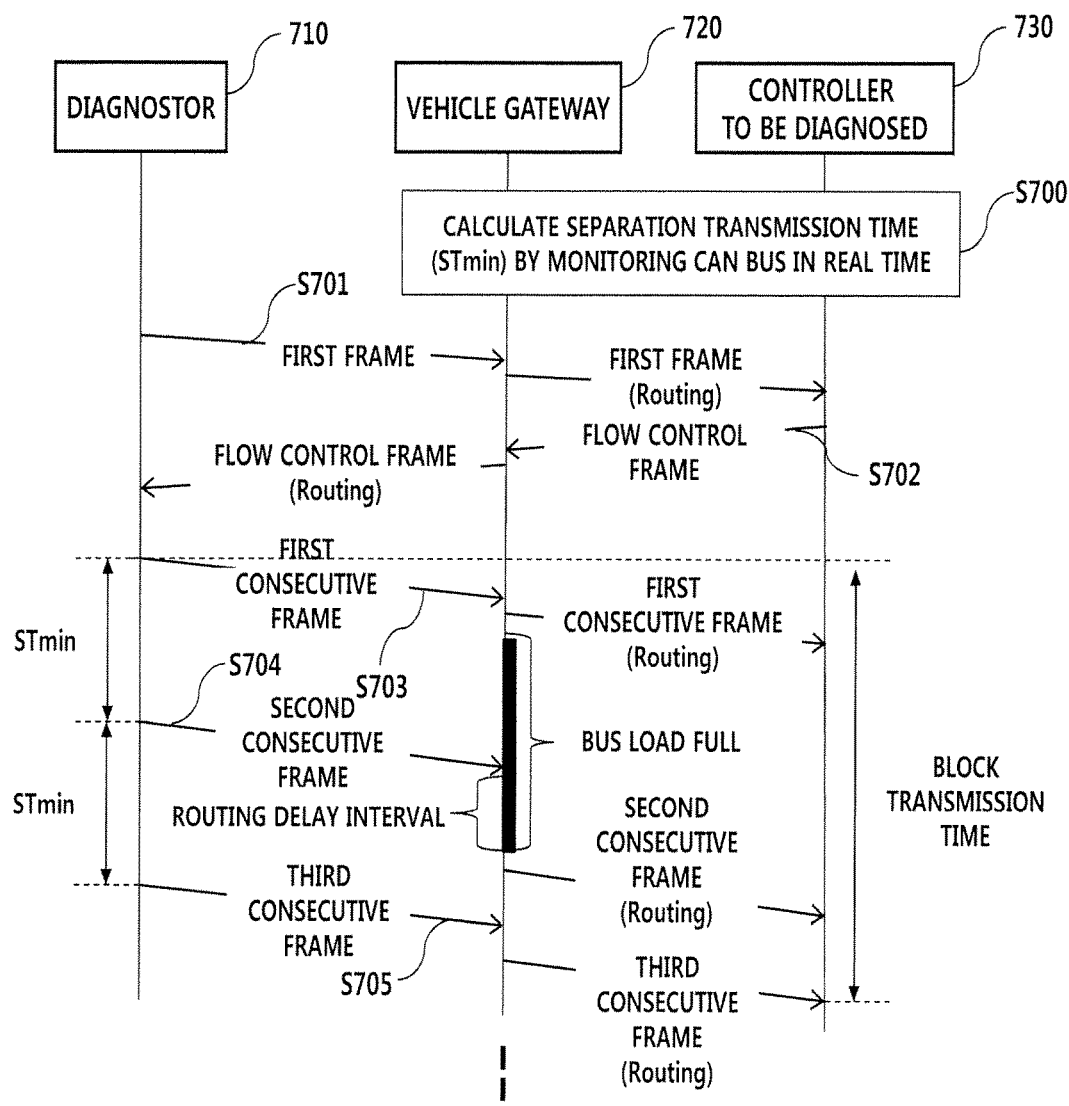
FIG. 7 is a flowchart for description of a procedure of controlling mass diagnostic communication in a vehicle gateway according to an embodiment of the present disclosure.

FIG. 7 is a flowchart for description of a procedure of controlling mass diagnostic communication in a vehicle gateway according to an embodiment of the present disclosure.

As illustrated in FIG. 7, all messages exchanged between a diagnostor 710 and a controller to be diagnosed 730 may be routed and delivered by a vehicle gateway 720.

In S700, the vehicle gateway 720 and the controller to be diagnosed 730 may dynamically calculate a separation transmission time (STmin) based on a condition of a CAN bus monitored in real time.

For example, the vehicle gateway 720 may calculate a separation transmission time in which a diagnostic message received from the diagnostor 710 may be consistently routed to the controller to be diagnosed 730 without omission based on a load condition of the CAN bus and a priority of a message to be routed, and transmit the calculated separation transmission time to the controller to be diagnosed 730 through a predetermined control signal (here, the control signal may be transmitted in a CAN frame). In S701 and S702, when a first frame reporting transmission of mass data generated by the diagnostor 710 is received through the vehicle gateway 720, the controller to be diagnosed 730 may transmit a flow control frame including the separation transmission time received from the vehicle gateway 720 and a size of a currently receivable block to the diagnostor 710 through the vehicle gateway 720.

In S703 to S705, the diagnostor 710 may transmit first to third consecutive frames generated based on the received flow control frame to the vehicle gateway 720 at intervals corresponding to STmin.

In this instance, the vehicle gateway 720 may route the received consecutive frames to the controller to be diagnosed 730.

As illustrated in FIG. 7, when the CAN bus load is full at a point in time at which the second consecutive frame is received from the vehicle gateway 720, that is, when the received second consecutive frame cannot be immediately routed, the vehicle gateway 720 may delay routing of the second consecutive frame. Here, it should be noted that a routing delay interval may be dynamically changed according to a point in time at which a state of the CAN bus load is changed to a state in which consecutive frames may be transmitted. In addition, the routing delay interval cannot exceed the separation transmission period (STmin). When the bus load is kept full until the routing delay interval exceeds the separation transmission period, and thus the consecutive frames cannot be routed, the vehicle gateway 720 may increase the separation transmission period by a certain time, and transmit the increased separation transmission period to the controller to be diagnosed 730. Therefore, the vehicle gateway 720 may prevent routing of a mass diagnostic message from continuously failing.

According to an embodiment, the vehicle gateway 720 may estimate or determine a separation transmission time at which omitted message transmission, that is, routing failure does not occur based on a length of an interval for which the bus load is full and an occurrence frequency at which the bus load is full measured during a unit time through CAN bus monitoring. Here, the length of the interval for which the bus load is full may refer to an average time for which the bus load is full during the unit time.

According to another embodiment, the vehicle gateway 720 may monitor a CAN bus state to add sizes of messages generated on the CAN bus during the unit time, and divide an added size of the messages by a maximum size of a message that can be generated on the CAN bus during the unit time, thereby calculating average bus load. Thereafter, the vehicle gateway 720 may estimate or determine the separation transmission period based on the calculated average bus load.

The foregoing method of the present disclosure may be implemented in a program command form executable by a vehicle controller and/or a vehicle gateway or by a module embedded thereof, and may be recorded in a non-transitory computer readable recording medium of the vehicle controller and/or the vehicle gateway.

Effects of the method and apparatus according to the present disclosure are described below.

The present disclosure has an advantage of providing a method and apparatus for controlling mass diagnostic communication in a vehicle capable of preventing a transmission error or omission of a vehicle diagnostic message.

In addition, the present disclosure has an advantage of providing a vehicle gateway capable of dynamically calculating a separation transmission period, in which a diagnostic message received from a diagnostor can be routed, based on network load such that the diagnostic message is not omitted during transmission, and transmitting the calculated separation transmission period to a controller to be diagnosed when the diagnostor and the controller to be diagnosed communicate with each other through the vehicle gateway.

In addition, the present disclosure has an advantage of providing a method and apparatus for controlling mass diagnostic communication in a vehicle capable of adaptively controlling a separation transmission period of a diagnostic message by measuring a reception interval on a CAN bus of a message having a higher priority than that of the diagnostic message and a processing time of the message.

In addition, the present disclosure has an advantage of minimizing diagnosis and reprogramming time of controllers included in a vehicle through a diagnostor.

Effects that may be obtained from the present disclosure are not limited to the above-mentioned effects, and other effects not mentioned herein may be clearly understood by those skilled in the art from the above description.

Those skilled in the art will appreciate that the present disclosure may be carried out in other specific ways than those set forth herein without departing from the spirit and essential characteristics of the present disclosure.

The above exemplary embodiments are therefore to be construed in all aspects as illustrative and not restrictive. The scope of the disclosure should be determined by the appended claims and legal equivalents thereof, not by the above description, and all changes coming within the meaning and equivalency range of the appended claims are to be embraced therein.

What is claimed is:

1. A method of controlling mass diagnostic communication in a controller connected to a vehicle controller area network (CAN) communication network, comprising:
   calculating, by the controller, a reception time interval between a previously received CAN frame and a currently received CAN frame;
   calculating, by the controller, a CAN frame processing time in the controller based on a length of data included in the previously received CAN frame or currently received CAN frame;
   determining, by the controller, a separation transmission period of a mass diagnostic message by comparing the calculated reception time interval with the calculated CAN frame processing time; and
   transmitting, by the controller, to a diagnostor, a predetermined flow control frame including the determined separation transmission period when a predetermined CAN frame reporting transmission of the mass diagnostic message is received from the diagnostor.

2. The method according to claim 1, wherein the reception time interval is calculated when an identifier (ID) included in the received CAN frame has a higher priority than a priority of a diagnostic ID allocated to the controller.

3. The method according to claim 1, wherein the CAN frame processing time is calculated based on a data length code (DLC) included in the previously received CAN frame or the currently received CAN frame.

4. The method according to claim 1, wherein the separation transmission period is determined such that a currently set separation transmission period increases by a predetermined time when the CAN frame processing time is greater than or equal to the reception time interval as a result of comparison.

5. The method according to claim 4, wherein the increased time corresponds to the reception time interval.

6. The method according to claim 1, wherein the separation transmission period is determined such that a currently set separation transmission period decreases by a predetermined time when the CAN frame processing time is less than the reception time interval as a result of comparison.

7. The method according to claim 6, wherein the calculated reception time interval is replaced by the separation transmission period to decrease the separation transmission period when the calculated reception time interval is greater than the currently set separation transmission period.

8. The method according to claim 6, wherein the decreased time of the separation transmission period is determined in inverse proportion to a CAN bus load.

9. A method of controlling mass diagnostic communication in a vehicle gateway routing a diagnostic message received from a diagnostor to a controller to be diagnosed through a CAN bus, comprising:
   monitoring, by the vehicle gateway, a load state of the CAN bus in real time;
   determining, by the vehicle gateway, a separation transmission period based on the monitored load state of the CAN bus; and
   transmitting, by the vehicle gateway, a predetermined control signal including the determined separation transmission period to the controller to be diagnosed,
   wherein the monitoring includes:
   adding sizes of messages generated on the CAN bus during a unit time; and
   calculating an average bus load of the CAN bus by dividing the added size of the messages by a maximum size of a message generable on the CAN bus during the unit time,
   wherein the separation transmission period is determined based on the calculated average bus load.

10. The method according to claim 9, wherein the monitoring includes measuring an average time interval for which a load of the CAN bus is full during a unit time and an occurrence frequency at which the load is full,
   wherein the separation transmission period is determined based on at least one of the measured average time interval for which the load is full and the measured occurrence frequency at which the load is full.

11. The method according to claim 9, wherein the controller to be diagnosed transmits a flow control frame including the determined separation transmission period to the diagnostor through the vehicle gateway.

12. The method according to claim 11, further comprising receiving, by the vehicle gateway, consecutive frames generated based on the flow control frame from the diagnostor,
   wherein routing of the received consecutive frames is delayed until a state in which the load of the CAN bus is full is released when the CAN bus is in the state at a point in time at which the consecutive frames are received.

13. The method according to claim 12, further comprising:
increasing, by the vehicle gateway, the separation transmission period when a delayed time exceeds the determined separation transmission period; and
transmitting, by the vehicle gateway, the control signal including the increased separation transmission period to the controller to be diagnosed.

14. A vehicle controller connected to a vehicle CAN communication network, comprising:
a non-transitory memory;
a CAN transceiver for transmitting and receiving a CAN frame through the CAN communication network; and
a main control unit for calculating a reception time interval between a previously received CAN frame and a currently received CAN frame, calculating a CAN frame processing time in the controller based on a length of data included in the previously received CAN frame or the currently received CAN frame, and determining a separation transmission period of a mass diagnostic message by comparing the calculated reception time interval with the calculated CAN frame processing time,
wherein the main control unit performs a control operation such that a predetermined flow control frame including the determined separation transmission period is transmitted to a diagnostor when a predetermined CAN frame reporting transmission of the mass diagnostic message is received.

15. The vehicle controller according to claim 14, wherein the main control unit calculates the reception time interval when an ID included in the previously received CAN frame and the currently received CAN frame has a higher priority than a priority of a diagnostic ID allocated to the controller.

16. The vehicle controller according to claim 14, wherein the main control unit calculates the CAN frame processing time based on a DLC included in the previously received CAN frame or the currently received CAN frame.

17. The vehicle controller according to claim 14, wherein the main control unit determines the separation transmission period such that a currently set separation transmission period increases by a predetermined time when the CAN frame processing time is greater than or equal to the reception time interval as a result of comparison.

18. The vehicle controller according to claim 17, wherein the increased time corresponds to the reception time interval.

19. The vehicle controller according to claim 14, wherein the main control unit determines the separation transmission period such that a currently set separation transmission period decreases by a predetermined time when the CAN frame processing time is less than the reception time interval as a result of comparison.

20. The vehicle controller according to claim 19, wherein the calculated reception time interval is replaced by the separation transmission period to decrease the separation transmission period when the calculated reception time interval is greater than the currently set separation transmission period.

21. The vehicle controller according to claim 19, wherein the decreased time is determined in inverse proportion to a CAN bus load.

* * * * *